(12) United States Patent
Park et al.

(10) Patent No.: US 12,465,192 B2
(45) Date of Patent: Nov. 11, 2025

(54) DISHWASHER

(71) Applicant: SAMSUNG ELECTRONICS CO., LTD., Suwon-si (KR)

(72) Inventors: Kitae Park, Suwon-si (KR); Junho Lee, Suwon-si (KR); Kyungup Lim, Suwon-si (KR); Minho Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 316 days.

(21) Appl. No.: 18/099,521

(22) Filed: Jan. 20, 2023

(65) Prior Publication Data

US 2023/0148829 A1     May 18, 2023

Related U.S. Application Data

(63) Continuation of application No. PCT/KR2021/007807, filed on Jun. 22, 2021.

(30) Foreign Application Priority Data

Jul. 22, 2020    (KR) ........................ 10-2020-0090722

(51) Int. Cl.
    *A47L 15/42*        (2006.01)
    *C02F 1/42*         (2023.01)

(52) U.S. Cl.
    CPC ....... *A47L 15/4229* (2013.01); *A47L 15/4214* (2013.01); *C02F 1/42* (2013.01);
(Continued)

(58) Field of Classification Search
None
See application file for complete search history.

(56) References Cited

U.S. PATENT DOCUMENTS 6,800,598 B1    10/2004    Waeschenbach et al.
9,023,156 B2     5/2015    Han et al.
(Continued)

FOREIGN PATENT DOCUMENTS

EP     0 860 140 A2     8/1998
EP     0 861 630 A2     9/1998
(Continued)

OTHER PUBLICATIONS

International Search Report, PCT/ISA/210, dated Sep. 29, 2021, in PCT/KR2021/007807.
(Continued)

*Primary Examiner* — Levon J Shahinian
(74) *Attorney, Agent, or Firm* — STAAS & HALSEY LLP

(57) ABSTRACT

A dishwasher including: a cleaning chamber; a water tank which stores water in order to supply water to the cleaning chamber; a water softener which is connected to the water tank and to which a filter is mountable; and a regenerator which is connected to the water softener in order to regenerate the filter while the filter is mounted to the water softener, wherein the water tank comprises a softened water chamber that is supplied with water that has been softened in the water softener and stores same, and a recycled water chamber which receives softened water from the softened water chamber and is connected to the regenerator in order to supply water to the regenerator.

13 Claims, 7 Drawing Sheets

(52) U.S. Cl.
CPC .... *C02F 2201/005* (2013.01); *C02F 2303/16* (2013.01); *C02F 2307/12* (2013.01)

(56) References Cited

U.S. PATENT DOCUMENTS

| | | | |
|---|---|---|---|
| 9,492,053 | B2 | 11/2016 | Shin et al. |
| 9,861,253 | B2 | 1/2018 | Lee et al. |
| 2003/0213505 | A1 | 11/2003 | Price et al. |
| 2005/0236019 | A1* | 10/2005 | Bang .................. A47L 15/4217 134/58 D |
| 2005/0241675 | A1 | 11/2005 | Jung et al. |
| 2011/0005557 | A1 | 1/2011 | Braun et al. |
| 2013/0032181 | A1 | 2/2013 | Shin et al. |
| 2014/0224286 | A1 | 8/2014 | Lee et al. |

FOREIGN PATENT DOCUMENTS

| | | |
|---|---|---|
| EP | 0 864 290 A2 | 9/1998 |
| EP | 0 876 789 B1 | 10/2003 |
| EP | 2 845 839 B1 | 12/2017 |
| KR | 10-2005-0081447 | 8/2005 |
| KR | 10-1054130 | 8/2011 |
| KR | 10-1065697 | 9/2011 |
| KR | 10-1070063 | 10/2011 |
| KR | 10-1238083 | 2/2013 |
| KR | 10-1247049 | 4/2013 |
| KR | 10-1296003 | 8/2013 |
| KR | 10-2015-0029416 | 3/2015 |
| KR | 10-2018-0015930 | 2/2018 |
| KR | 10-2025807 | 11/2019 |
| KR | 110759429 A | 2/2020 |
| KR | 10-2125724 | 6/2020 |

OTHER PUBLICATIONS

Written Opinion, PCT/ISA/237, dated Sep. 29, 2021, in PCT/KR2021/007807.

* cited by examiner

DISHWASHER

CROSS-REFERENCE TO RELATED APPLICATIONS

This application is a continuation of International Application PCT/KR2021/007807, filed Jun. 22, 2021, and claims foreign priority to Korean application 10-2020-0090722, filed Jul. 22, 2020.

BACKGROUND

1. Field

The present disclosure relates to a dishwasher, and more particularly, to a dishwasher including an improved water tank structure.

2. Description of Related Art

In general, a dishwasher is a device for washing and drying stored dishes by spraying washing water at a high pressure. The dishwasher operates such that washing water is sprayed at a high pressure into a washing chamber in which the dishes are stored, and the sprayed washing water comes into contact with the dishes to wash foreign substances such as food waste on a surface of the dishes.

Particularly, the dishwasher includes a tub in which a washing chamber is formed and a sump mounted on a bottom of the tub to store washing water. Washing water is moved to a spray nozzle by a pumping action of a sump pump mounted inside the sump, and the washing water moved to the spray nozzle is sprayed at a high pressure through a spray hole formed at an end of the spray nozzle. The washing water sprayed at a high pressure hits a surface of the dishes, and foreign substances, such as food waste, on the dishes falls to the bottom of the tub.

The dishwasher is provided with a water tank that delivers the supplied washing water to the sump. A regenerator chamber supplying water to a regenerator may be provided in the water tank. At this time, it is required to store more than a certain amount of water in the regenerator chamber for the operation of the regenerator.

SUMMARY

One aspect of the present disclosure provides a dishwasher including a water softener to which a filter is mountable, a regenerator, and a water tank including a soft water chamber configured to receive water softened by the water softener as soft water, and to store the received soft water, and a regeneration water chamber configured to receive soft water stored in the soft water chamber from the soft water chamber, store the soft water received from the soft water chamber, and supply soft water stored in the regeneration water chamber to the regenerator to regenerate the filter while the filter is mounted to the water softener.

The water tank may further include a communication flow path connecting the soft water chamber to the regeneration water chamber so as to allow soft water stored in the soft water chamber to flow from the soft water chamber to the regeneration water chamber.

The communication flow path may be formed in a middle of the water tank to allow soft water stored in the soft water chamber to flow to the regeneration water chamber after the soft water chamber is filled with soft water.

The water tank may further include a water tank case forming an exterior of the water tank. The communication flow path may be recessed on one surface of the water tank case.

The water tank may further include a first flow path wall forming a first flow path receiving water from an outside of the water tank, and a second flow path wall forming a second flow path to supply water from the first flow path to the water softener. The regeneration water chamber may be formed between the first flow path wall and the second flow path wall.

The communication flow path may bypass the second flow path wall to extend vertically between the soft water chamber and the regeneration water chamber.

The regeneration water chamber may include a pressure holder connected to an outside of the soft water chamber to allow a pressure in the regeneration water chamber to be equilibrated with atmospheric pressure.

The pressure holder may allow the soft water chamber and the regeneration water chamber to communicate with each other.

The pressure holder may be arranged at an upper portion of the water tank to store water at a high level in the water tank.

The water tank may include an inclined rib inclined with respect to a water surface in the water tank. The pressure holder may be formed below the inclined rib.

The water tank may include a water tank case forming an exterior of the water tank. The pressure holder may be recessed on one surface of the water tank case.

The regenerator may be arranged below the water tank. The water tank may further include a regeneration water inlet valve arranged below the regeneration water chamber to control whether to input water so as to input water, stored in the regeneration water chamber, to the regenerator.

In order to prevent water of the soft water chamber from being discharged to the regeneration water chamber, the regeneration water inlet valve may be opened in response to a water level in the soft water chamber being lower than a water level in the regeneration water chamber.

The regeneration water inlet valve may be opened in response to the soft water chamber being empty.

The water tank may further include a damper provided in the communication flow path so as to adjust an amount of water flowing from the soft water chamber to the regeneration water chamber.

Another aspect of the present disclosure provides a dishwasher including a washing chamber, a water tank storing water to supply water to the washing chamber, a water softener connected to the water tank, and a regenerator connected to the water softener to regenerate the water softener. The water tank includes a soft water chamber receiving water, which is softened, from the water softener, and storing the soft water, a regeneration water chamber receiving the soft water from the soft water chamber and connected to the regenerator to supply regeneration water to the regenerator, and a regeneration water inlet valve arranged in the regeneration water chamber to input water, which is stored in the regeneration water chamber, to the regenerator.

The regenerator may be arranged below the water tank, and the regeneration water inlet valve may be arranged below the regeneration water chamber to allow the water of the regeneration water chamber to flow to the regenerator.

The regeneration water inlet valve may be opened in response to a water level in the soft water chamber being lower than a water level in the regeneration water chamber.

The regeneration water inlet valve may be opened in a drying cycle of the dishwasher.

The dishwasher may further include a main body and a door rotatably installed on the main body. The regeneration water inlet valve may be opened in response to the door being closed.

Additional aspects of various embodiments will be set forth in part in the description which follows and, in part, will be apparent from the description, or may be learned by practice of embodiments.

DESCRIPTION OF THE DRAWINGS

Aspects, features, and advantages of embodiments of the present disclosure will be more apparent from the following description taken in conjunction with the accompany drawings, in which.

DETAILED DESCRIPTION

Figure 1:
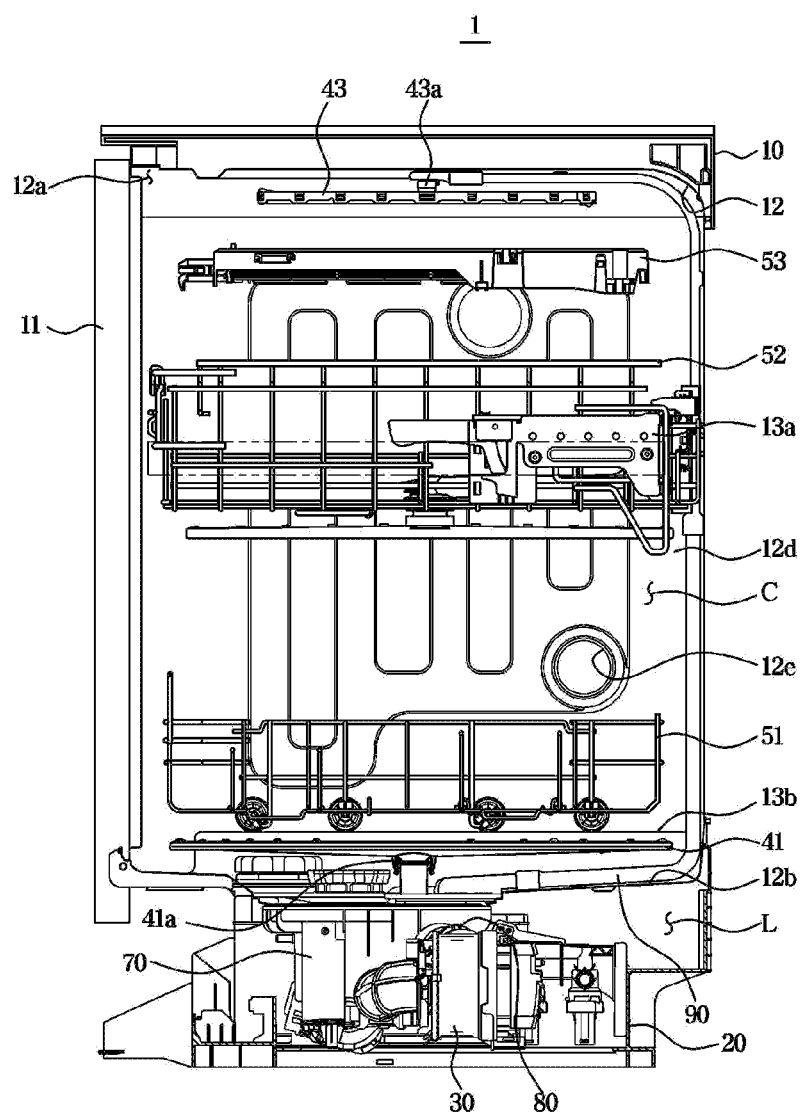
FIG. 1 is a cross-sectional view illustrating a dishwasher according to an embodiment of the present disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "left", "right", and the like may be defined by the drawings, but the shape and the location of the component is not limited by the term.

Various embodiments of the present disclosure are directed to providing a dishwasher capable of easily storing and supplying regeneration water.

According to various embodiments of the present disclosure, it is possible to smoothly supply regeneration water to a regenerator by using an improved structure in a water tank.

Further, various embodiments of the present disclosure are directed to providing a dishwasher capable of smoothly operating a regenerator.

The disclosure will be described more fully hereinafter with reference to the accompanying drawings.

Figure 2:
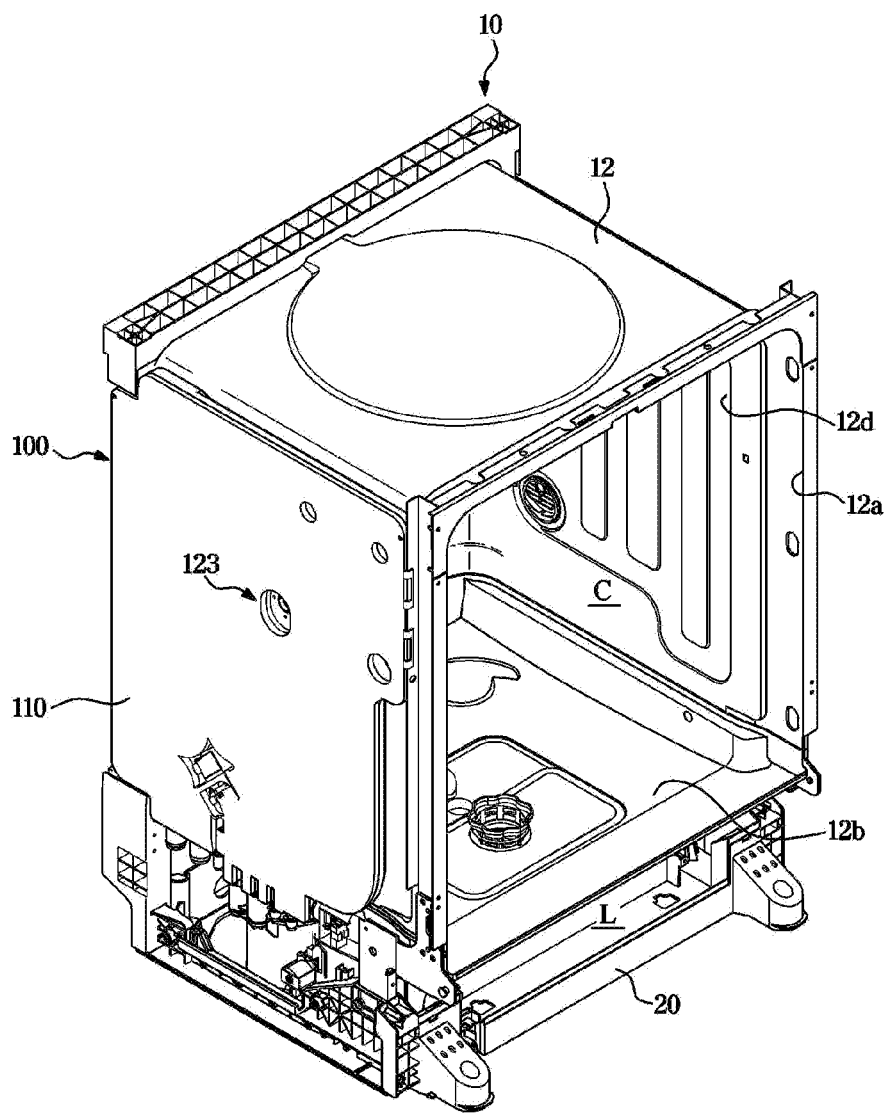
FIG. 2 is a perspective view illustrating a water tank assembly mounted on a tub in the dishwasher according to FIG. 1, according to an embodiment of the present disclosure.

FIG. 1 is a cross-sectional view illustrating a dishwasher according to one embodiment of the present disclosure. FIG. 2 is a perspective view illustrating a water tank assembly mounted on a tub in the dishwasher according to FIG. 1.

As illustrated in FIGS. 1 and 2, a dishwasher 1 may include a main body 10 forming an exterior.

The dishwasher 1 may include a tub 12 provided inside the main body 10. The tub 12 may be provided in a substantially box shape. One surface of the tub 12 may be open. That is, the tub 12 may include an opening 12a. As an example, a front surface of the tub 12 may be opened.

The dishwasher 1 may further include a door 11 configured to open and close the opening 12a of the tub 12. The door 11 may be installed in the main body 10 to open and close the opening 12a of the tub 12. The door 11 may be rotatably installed in the main body 10.

The dishwasher 1 may further include a storage container provided inside the tub 12 to accommodate dishes. The storage container may include a plurality of baskets 51, 52, and 53. Dishes having a relatively large volume may be accommodated in the plurality of baskets 51, 52, and 53. However, the types of dishes accommodated in the plurality of baskets 51, 52 and 53 are not limited to relatively large-volume dishes. That is, not only relatively large-volume dishes but also relatively small-volume dishes may be accommodated in the plurality of baskets 51, 52, and 53.

The plurality of baskets 51, 52 and 53 may include an intermediate basket 52 positioned in a middle portion with respect to a height direction of the dishwasher 1, and a lower basket 51 positioned in a lower portion with respect to the height direction of the dishwasher 1. The intermediate basket 52 may be provided to be supported by an intermediate guide rack 13a, and the lower basket 51 may be provided to be supported by a lower guide rack 13b. The intermediate guide rack 13a and the lower guide rack 13b may be installed on a side surface 12d of the tub 12 so as to be slidable toward the opening 12a of the tub 12. The side surface 12d of the tub 12 may include a right inner surface of the tub 12 and a left inner surface of the tub 12.

The plurality of baskets 51, 52 and 53 may include an upper basket 53 positioned in an upper portion with respect to the height direction of the dishwasher 1. The upper basket 53 may be formed in a rack assembly type to accommodate relatively small-volume dishes. It is appropriate that the upper basket 53 may accommodate a cooking utensil such as a ladle, a knife, or a turner, or cutlery. In addition, the rack assembly may accommodate a small cup such as an espresso cup. However, the kind of dishes accommodated in the upper basket 53 is not limited to the above example.

The dishwasher 1 may further include a sump 70 provided to store washing water. The dishwasher 1 may include a washing chamber C formed inside the tub 12. The washing chamber C is a space in which dishes placed in the baskets 51, 52 and 53 are washed by the washing water and dried.

The washing chamber C may be defined as an inner space of the tub 12 formed by the front and rear surface, a lower surface 12*b* of the tub, and the sump 70 communicating with the lower surface 12*b*.

The dishwasher 1 may further include a plurality of spray units 41, 42, and 43 configured to spray washing water. The spray unit may include a first spray unit 41 arranged below the lower basket 51 with respect to the height direction of the dishwasher 1, a second spray unit 42 arranged below the intermediate basket 52 with respect to the height direction of the dishwasher 1, and a third spray unit 43 arranged above the upper basket 53 with respect to the height direction of the dishwasher 1.

The first spray unit 41 may be configured to be rotated about a first rotating shaft 41*a*, and the second spray unit 42 may be configured to be rotated about a second rotating shaft 42*a*, and the third spray unit 43 may be configured to be rotated about a third rotating shaft 43*a*.

However, the disclosure is not limited thereto. The first spray unit 41 may be fixed to one side of the lower surface 12*b* unlike the second spray unit 42 and the third spray unit 43. In this case, the first spray unit 41 may be configured to spray washing water in a substantially horizontal direction by a fixed nozzle, and the washing water sprayed in the horizontal direction from the nozzle of the first spray unit 41 may be directed to the upper side because a direction of the sprayed water is changed by a switching assembly (not shown).

The third spray unit 43 may spray the washing water toward the dishes stored in the upper basket 53, the intermediate basket 52, and the lower basket 51. The second spray unit 42 may spray the washing water toward the dishes stored in the intermediate basket 52 and the upper basket 53.

The first spray unit 41 may be arranged on the lower surface 12*b* of the tub 12, unlike the second spray unit 42 and the third spray unit 43. Particularly, the first spray unit 41 may be fixed to the sump 70.

The dishwasher 1 may include a circulation pump 30 configured to pump water stored in the sump 70 toward the spray units 41, 42, and 43. The washing water pumped by the circulation pump 30 may be supplied to the first spray unit 41 through an alternating device 80 connected to the circulation pump 30. Alternatively, the washing water pumped by the circulation pump 30 may be moved upward by a duct 90 and then supplied to the second spray unit 42 or the third spray unit 43.

As mentioned above, the washing water stored in the sump 70 or washing water introduced into the dishwasher 1 from the outside may flow to the alternating device 80 by the circulation pump 30. The alternating device 80 may supply the washing water to the first spray unit 41 through a connector (not shown) connected to the first spray unit 41, and may supply the washing water to the duct 90 through a flow path 62 connected to the duct 90.

The alternating device 80 may selectively supply the washing water to at least one of the connector and the duct 90. The alternating device 80 may be arranged in a machine room L arranged below the washing chamber C.

The dishwasher 1 may include the machine room L arranged below the tub 12. The machine room L may be formed by a lower frame 20.

The above-described circulation pump 30, sump 70, and alternating device 80 may be arranged in the machine room L and further a water supply hose 131*a* and a drain hose 137*a* described later may be arranged in the machine room L (refer to FIG. 7).

The dishwasher 1 may include the water supply hose 131*a* provided to supply washing water from the outside to the inside of the tub 12, and the drain hose 137*a*.

The dishwasher 1 may include the water supply hose 131*a* provided to supply washing water from the outside to the inside of the tub 12. One end of the water supply hose 131*a* may be connected to the water tank assembly 100 communicating with the tub 12. The other end of the water supply hose 131*a* may penetrate the lower frame 20 and be connected to an external water supply source (not shown).

The water tank assembly 100 is provided to be connected to a connection hole 12*e* formed on the side surface 12*d* of the tub 12.

The water tank assembly 100 includes a water tank case 110. The water tank case 110 may further include a tub fixer 123 configured to fix the water tank assembly 100 to the side surface 12*d* of the tub 12. At least one fixer 123 may be formed.

The water tank case 110 may be formed in a shape and size corresponding to the side surface 12*d* of the tub 12. In an embodiment of the disclosure, the water tank case 110 has a size and shape corresponding to the side surface 12*d* of the tub 12, but is not limited thereto. For example, the water tank case may be smaller than the tub.

Figure 3:
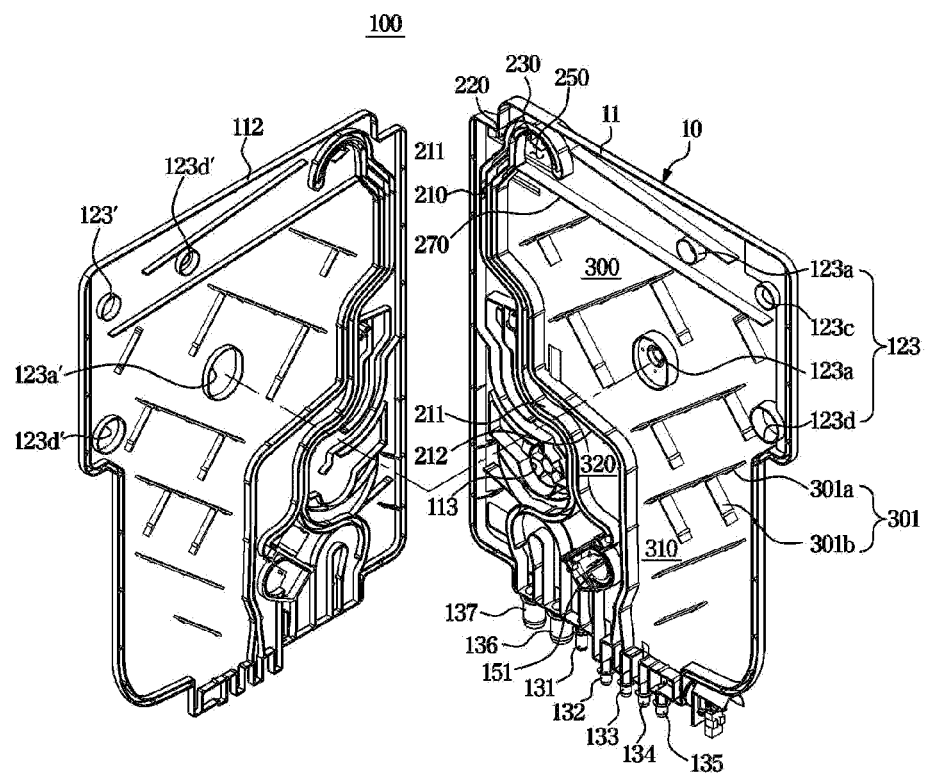
FIG. 3 is an exploded perspective view illustrating a water tank case in the dishwasher according to FIG. 1, according to an embodiment of the present disclosure.
Figure 4:
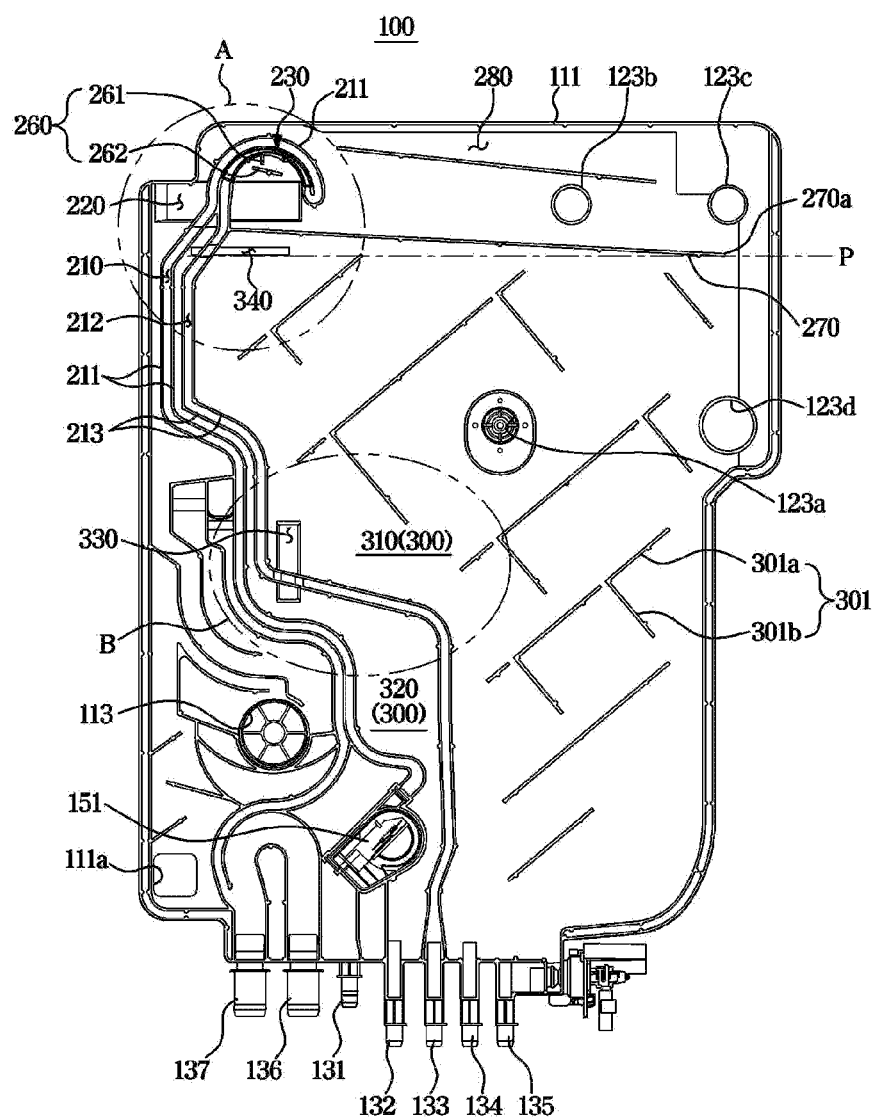
FIG. 4 is a plan view illustrating a second water tank case in the dishwasher shown in FIG. 3, according to an embodiment of the present disclosure.

FIG. 3 is an exploded perspective view illustrating a water tank case in the dishwasher according to FIG. 1. FIG. 4 is a plan view illustrating a second water tank case in the dishwasher shown in FIG. 3.

Referring to FIGS. 3 and 4, the water tank assembly 100 may be provided to supply washing water into the tub 12. The water tank assembly 100 may be mounted on the tub 12. The water tank assembly 100 may be mounted on the side surface 12*d* of the tub 12.

The water tank assembly 100 may include the water tank case 110. The water tank case 110 may include a first water tank case 111 and a second water tank case 112. The water tank case 110 may be formed by coupling the first water tank case 111 and the second water tank case 112 to each other.

The first water tank case 111 is provided to be coupled to the tub 12. The first water tank case 111 is provided to be in contact with and coupled to the side surface 12*d* of the tub 12. An air hole 111*a* for discharging air to the outside or introducing air from the outside may be formed in at least a part of the first water tank case 111.

A tub connection hole 113 communicating with the tub 12 may be formed in the first water tank case 111 for introducing air to the tub 12 or discharging air from the tub 12. The tub communication hole 113 may be connected to the connection hole 12*e* formed on the side surface 12*d* of the tub 12.

The first water tank case 111 and the second water tank case 112 may be coupled to each other to form the water tank case 110.

The water tank case 110 may be provided with the tub fixer 123 configured to couple the water tank assembly 100 to the side surface 12*d* of the tub 12. One or more tub fixer 123 may be provided. The tub fixer 123 may be provided on the first water tank case 111. At least a part of the tub fixer 123 may be provided on the second water tank case 112. The water tank case 110 may be fixed to the side surface 12*d* of the tub 12 through the tub fixer 123.

The tub fixer 123 may include a first tub fixer 123a, a second tub fixer 123b, a third tub fixer 123c, and a fourth tub fixer 123d formed in the first water tank case 111. The first tub fixer 123a to the fourth tub fixer 123d may be spaced apart from each other. In an embodiment of the disclosure, it is described that four tub fixers including the first tub 123a to the fourth tub 123d are spaced apart from each other in a water tank 300, but the disclosure is not limited thereto. For example, the number of tub fixers may vary according to the size of the water tank case and the size and shape of the tub.

The tub fixer 123 may include a fifth tub fixer 123a' and a sixth tub fixer 123d' which are formed at a position, corresponding to the first tub fixer 123a and the fourth tub fixer 123d, in the second water tank case 112. The fifth tub fixer 123a' and the sixth tub fixer 123d' may be formed to correspond to the first tub fixer 123a and the fourth tub fixer 123d so as to be coupled to the first tub fixer 123a and the fourth tub fixer 123d, respectively.

The water tank assembly 100 may include the air hole 111a. The air hole 111a may be formed in the water tank case 110. The air hole 111a may be formed in the lower left side of the first water tank case 111. Outside air may be introduced into the tub 12 or air inside the tub 12 may be discharged to the outside through the air hole 111a. In an embodiment of the disclosure, it is described that the air hole 111a is formed in the first water tank case 111 of the water tank assembly 100 but the disclosure is not limited thereto.

The water tank assembly 100 may further include a first flow path 210 provided inside the water tank case 110 to allow washing water to be introduced, and a first flow path wall 211 forming the first flow path 210. The first flow path wall 211 may be provided in a pair.

The water tank assembly 100 may further include a second flow path 212 provided inside the water tank case 110 to allow washing water to be discharged, and a second flow path wall 213 forming the second flow path 212. The second flow path wall 213 may be provided in a pair.

The water tank assembly 100 may include an air break 230 provided to prevent water from flowing backwards. The air break 230 may include an air break hole 231 formed by opening at least a portion of the second flow path 212.

The water tank assembly 100 may further include an air break chamber 250 communicating with the air break 230 and provided to store water discharged from the air break 230.

The water tank assembly 100 may include a third flow path 220 connecting the air break chamber 250 and the tub 12 so as to guide water of the air break chamber 250 to the tub 12.

The water tank assembly 100 may include the water tank 300 provided in the water tank case 110 to store water passing through the first flow path 210.

The water tank assembly 100 may include an inclined rib 270. The inclined rib 270 may be formed to define the water tank 300 and the air break chamber 250 so as to allow a highest water level of the water tank to be higher than a height of the air break 230.

The water tank assembly 100 may include a water supply pipe 131 formed at a lower end of the water tank case 110 to supply water from the outside, a regeneration water inlet valve 132 provided to discharge regeneration water stored inside the water tank case 110, a water softener connector 133 provided to allow water, which is introduced into the water tank case 110, to be moved to a water softening device, a sump drain connector 136 connected to the sump to allow washing water, which is after use, to be discharged to the outside by a drain pump (not shown), and a drain hose connector 137 provided to allow water, which is moved to the sump drain connector 136, to be discharged to the outside.

The water tank assembly 100 may include a water tank inlet 134 formed at a lower end of the lower tank case 110 so as to allow water of the water softening device 160 to be introduced into the water tank 300, and a sump connector 135 provided to discharge water stored in the water tank 300. Water may be discharged to a sump connection hose 135a through the sump connector 135 (refer to FIG. 7).

The water tank inlet 134 and the sump connector 135 may be located at the lower end of the water tank 300 of the water tank case 110.

The water tank 300 of the water tank assembly 100 may be provided inside the water tank case 110. The water tank 300 may be formed between the first water tank case 111 and the second water tank case 112. The water tank 300 may be formed inside the first water tank case 111.

The water tank 300 may include a plurality of ribs 301 guiding the flow of the water to allow the water to be smoothly moved through the water tank inlet 134 and the sump connector 135. The rib 301 may include a first rib 301a arranged to be oblique, and a second rib 301b arranged in a direction perpendicular to the first rib 301a. A plurality of first ribs 301a and second ribs 301b may be spaced apart from each other. The plurality of ribs 301 may allow water to smoothly move inside the water tank 300.

The water supply pipe 131 and the water softener connector 133 of the water tank assembly 100 may be provided to be connected to the first flow path 210. The first flow path 210 of the water tank assembly 100 may be formed by using the first flow path wall 211 formed inside the water tank case 110. The first flow path 210 may be formed in the first water tank case 111 and the second water tank case 112, respectively.

The regeneration water inlet valve 132 of the water tank assembly 100 may be connected to the second flow path 212. The second flow path 212 of the water tank assembly 100 may be formed by using the second flow path wall 213 formed inside the water tank case 110. The second flow path 212 may be formed in the first water tank case 111 and the second water tank case 112, respectively.

In an embodiment of the disclosure, it is described that each flow path wall is provided but the disclosure is not limited thereto. For example, the first flow path may be formed by the first flow path wall formed in the first water tank case and by the inner surface of the second water tank case.

At least a portion of the first and second flow paths 210 and 212 of the water tank assembly 100 may be curved inside the water tank case 110 to have a predetermined curvature. The first and second flow paths 210 and 212 may include at least one curved member to secure flow stability of the introduced water.

The water tank assembly 100 may be provided with a sensor 151 configured to detect an amount of washing water introduced into the water tank case 110. The sensor 151 may be provided in the first flow path 210. The sensor 151 may be installed in the first flow path 210 to detect the amount of washing water introduced through the water supply pipe 131. The sensor 151 may be installed in a sensor installation member 215 formed in the water tank case 110. The sensor installation member 215 may be formed on the first water tank case 111 and the second water tank case 112, respectively. The sensor installation member 215 may be formed on a path of the first flow path 210.

The air break chamber 250 of the water tank assembly 100 may be formed to communicate with the air break 230 of the first flow path 210, and may store water discharged from the air break 230.

The air break chamber 250 may include a guide 260 guiding water discharged from the air break 230. The guide 260 may include a first guide rib 261 connected to the air break 230 and formed in a first inclination, and a second guide rib 262 spaced apart from the first guide rib 261 and formed in a second inclination so as to guide water to the third flow path 220. The second guide rib 262 may be disposed below the first guide rib 261. The second guide rib 262 may be located below the air break 230. The second guide rib 262 may be located below the air break hole 231.

The water tank case 110 may include a water flow wall 221 forming the third flow path 220 connecting the air break chamber 250 and the tub 12 so as to allow the water of the air break chamber 250 to be guided to the tub 12. The water flow wall 221 may be formed on the first water tank case 111. The water flow wall 221 may be formed by recessing at least a portion of the first water tank case 111 backward. The water flow wall 221 may be formed to be connected to at least a portion of the air break chamber 250. The water flow wall 221 may be formed to connect between the air break chamber 250 and the tub 12.

The water flow wall 221 may be provided to form at least a portion of the third flow path 220 provided to guide water, which is discharged through the air break hole 231 of the air break 230, to the tub 12. Another portion of the third flow path 220 may be formed by the first flow path wall 211 forming the first flow path 210 inside the water tank case 110. The third flow path 220 may be formed between the air break chamber 250 and the tub communication hole 113.

The water tank assembly 100 may further include a soft water chamber 310 and a regeneration water chamber 320. The soft water chamber 310 and the regeneration water chamber 320 may be formed in the water tank 300.

The soft water chamber 310 may be formed by the second flow path wall 213 and the water tank case 110 wall. The soft water chamber 310 may store water softened by a water softener 162 to be described later. That is, water may be supplied into the soft water chamber 310 through the water tank inlet 134.

The soft water chamber 310 may be formed in a space from a space, in which water flows into the water tank inlet 134, to the inclined rib 270. That is, water may be stored in the soft water chamber 310 up to a free end 270a located at a lowest position of the inclined rib 270. At this time, a state in which water is stored up to the free end 270a in the water tank 300 may be regarded as a full water level P.

The regeneration water chamber 320 may be formed between the first flow path wall 211 and the second flow path wall 213. The regeneration water chamber 320 may supply regeneration water to a regenerator 161 to be described later. That is, water may be supplied to the regenerator 161 through the regeneration water inlet valve 132. The regeneration water chamber 320 may extend up to the upper portion of the water tank 300.

Figure 5:
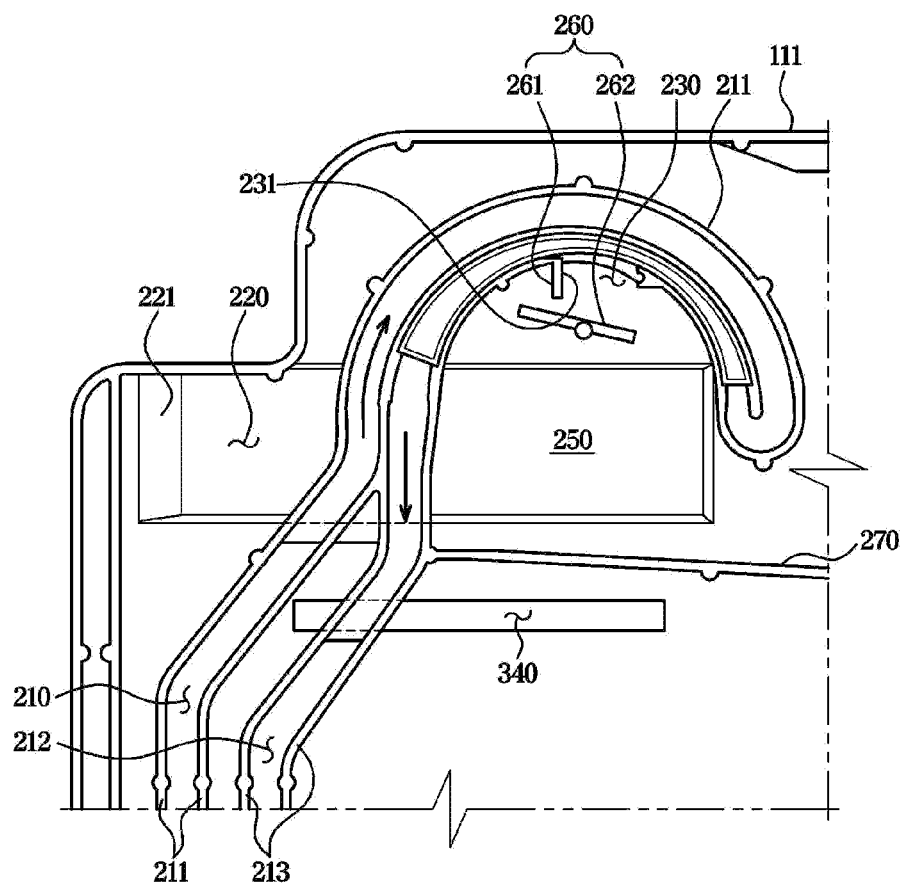
FIG. 5 is a view illustrating a part A in the dishwasher shown in FIG. 4, according to an embodiment of the present disclosure.
Figure 6:
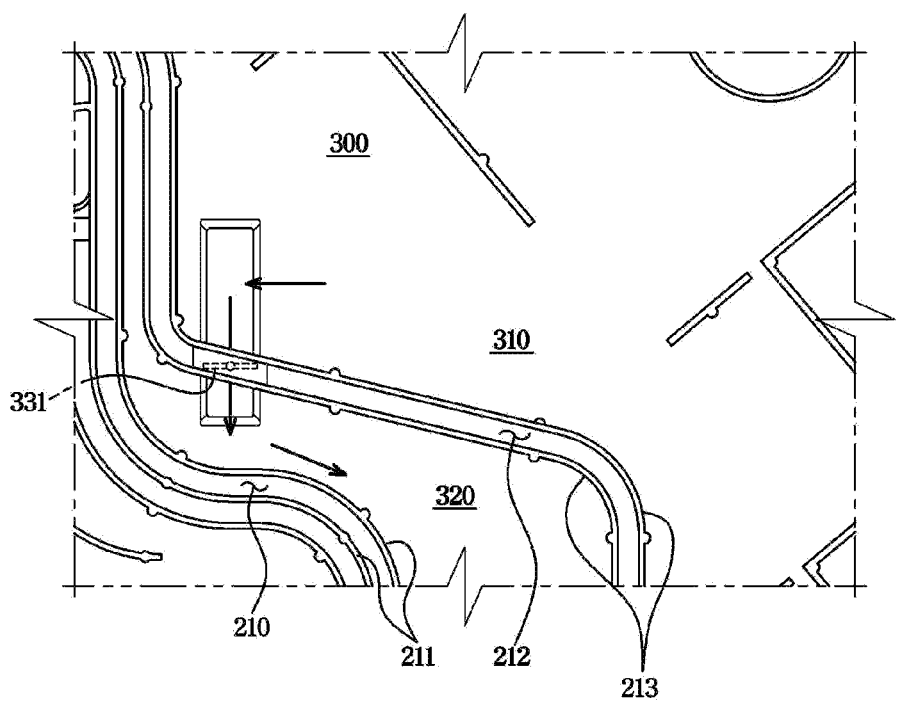
FIG. 6 is a view illustrating a part B of the dishwasher shown in FIG. 4, according to an embodiment of the present disclosure.

FIG. 5 is a view illustrating a part A in the dishwasher shown in FIG. 4. FIG. 6 is a view illustrating a part B of the dishwasher shown in FIG. 4.

Referring to FIGS. 5 and 6, a pressure holder 340 may be provided at an upper portion of the regeneration water chamber 320 to store water without forming a water pocket in the regeneration water chamber 320. The pressure holder 340 may be formed to be recessed on one surface of the second water tank case 112. Therefore, because the pressure holder 340 is recessed, the soft water chamber 310 and the regeneration water chamber 320 may achieve atmospheric pressure equilibrium regardless of the second flow path wall 213.

The pressure holder 340 may extend in the left and right direction to allow the regeneration water chamber 320 and the soft water chamber 310 to communicate with each other. The soft water chamber 310 may be connected to the outside through the open upper portion of the inclined rib 270, the third flow path 220, and the air hole 111a. Accordingly, the pressure holder 340 may allow the pressure in the regeneration water chamber 320 to be equilibrated with the pressure outside the water tank 300 (i.e., atmospheric pressure).

The pressure holder 340 may be formed at a higher position than the full water level P and thus the pressure holder 340 may not be submerged even when the water is stored in the water tank 300 at the full water level P. That is, the pressure holder 340 may be formed between the inclined rib 270 and the position of the full water level P. Accordingly, water may be stored at a high level in the water tank 300. However, the position of the pressure holder 340 is not limited thereto, and may be formed in various positions as long as an air pocket is not formed in the regeneration water chamber 320 and water may be stored.

In addition, it is described that the shape of the pressure holder 340 is a rectangular shape with a long side in the left and right direction, but is not limited thereto. Alternatively, the pressure holder 340 may include various shapes.

A communication flow path 330 allowing the soft water chamber 310 to communicate with the regeneration water chamber 320 may be formed in the water tank 300. Water introduced from the water tank inlet 134 may be stored in the soft water chamber 310, and after the water reaches a predetermined level, the water may flow to the regeneration water chamber 320 through the communication flow path 330. That is, the water may flow from the soft water chamber 310 to the communication flow path 330 and may flow from the communication flow path 330 into the regeneration water chamber 320. Accordingly, the communication flow path 330 may be formed in a middle of the water tank 300 and thus after the soft water chamber 310 is filled with a predetermined soft water, the soft water may be moved to the regeneration water chamber 320. Accordingly, water transferred from the soft water chamber 310 to the sump may be stored in a predetermined amount or more in the regeneration water chamber 320.

The communication flow path 330 may be formed to be recessed on one surface of the water tank case 110. Particularly, the communication flow path 330 may be recessed on one surface of the second water tank case 112. Accordingly, water may flow from the soft water chamber 310 to the regeneration water chamber 320 through the recessed communication flow path 330 without interfering with the second flow path wall 213.

The communication flow path 330 may bypass the second flow path wall 213 to extend vertically between the soft water chamber 310 and the regeneration water chamber 320. That is, the communication flow path 330 and the second flow path 212 are not directly connected. Therefore, the water flowing through the communication flow path 330 may not be mixed with the water flowing through the second flow path 212. Accordingly, water may be smoothly supplied to each of the soft water chamber 310 and the regeneration water chamber 320.

The communication flow path 330 may extend vertically to allow water to flow from top to bottom. In the drawing, the communication flow path 330 is shown in a rectangular shape with a long side in the vertical direction, but is not limited thereto. Alternatively, the communication flow path 330 may be formed in various shapes.

A damper 331 may be provided in the communication flow path 330 to control an amount of water flowing from the soft water chamber 310 to the regeneration water chamber 320. The damper 331 may adjust a flow rate and flow velocity to prevent the generation of the air pocket caused by a large amount of water rapidly flowing into the regeneration water chamber 320. The damper 331 may open and close the communication flow path 330 by a controller (not shown) provided in the dishwasher 1.

Figure 7:
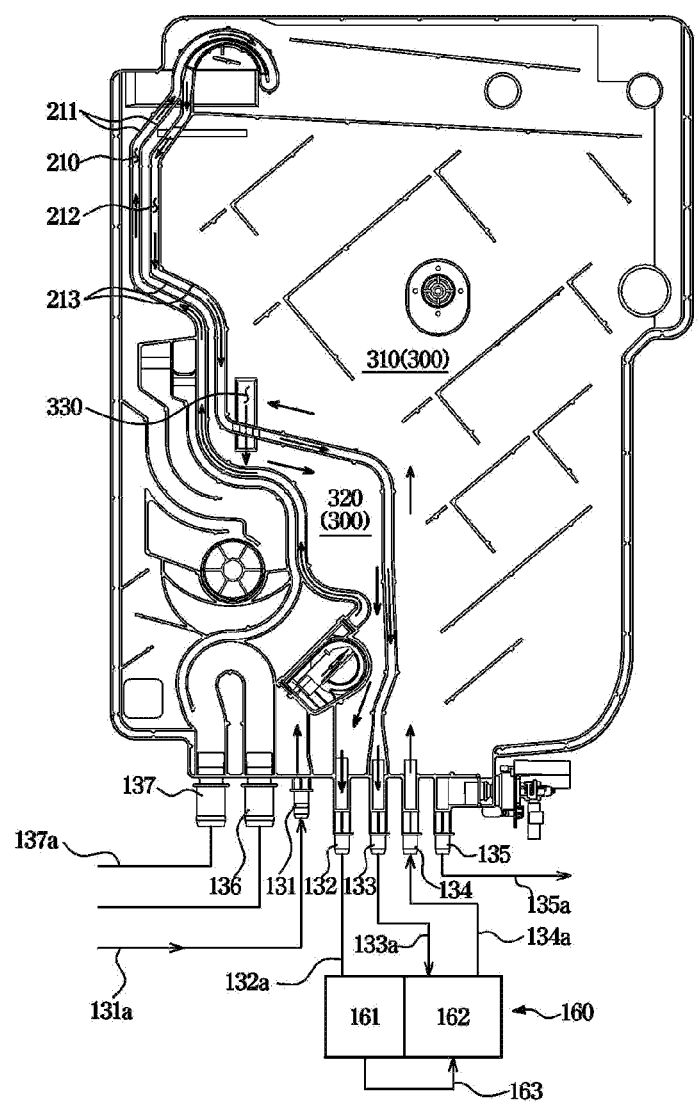
FIG. 7 is a view illustrating water supply and discharge in the dishwasher shown in FIG. 1, according to an embodiment of the present disclosure.

FIG. 7 is a view illustrating water supply and discharge in the dishwasher shown in FIG. 1.

Referring to FIG. 7, the dishwasher may further include the water softening device 160. The water softening device 160 may include the water softener 162 to which an ionization resin filter is mounted and a regenerator 161 functioning to purify the ionization resin filter installed in the water softener 162 by using a substance such as salt.

The water softening device 160 may be arranged under the water tank 300. That is, the water softener 162 and the regenerator 161 may be arranged under the water tank 300. However, the position of the water softening device 160 is not limited thereto and may be arranged in various positions such as above the water tank 300.

When water is supplied from the outside to the water supply pipe 131, provided at the lower end of the water tank case 110, through the water supply hose 131a for supplying the water into the water tank assembly 100, the supplied water may flow along the first flow path 210. The water flowing along the first flow path 210 may be moved to the second flow path 212 and the water flowing along the second flow path 212 may be moved to the water softener 162 from the water softener connector 133 through the water softener connection hose 133a formed at the lower end of the case 110. Water, which is softened by the water softener 162, may be connected to the water tank inlet 134 through the water tank connection hose 134a. Water introduced into the water tank 300 from the water tank inlet 134 may be stored in the soft water chamber 310. When the water is stored and reaches the same water level as the communication flow path 330, the water in the soft water chamber 310 may be moved to the regeneration water chamber 320 through the communication flow path 330. Water stored in the regeneration water chamber 320 may be stored in the regeneration water chamber 320 based on the regeneration water inlet valve 132 not being opened. When a water level of the water stored in the regeneration water chamber 320 reaches the water level at the same position as the communication flow path 330, the water level of the soft water chamber 310 and the water level of the regeneration water chamber 320 may rise to the same height. When water is continuously supplied from the water softener 162, the water may be stored up to the full water level P.

The water constantly supplied to the soft water chamber 310 may also be stored in the regeneration water chamber 320 and thus the regeneration water chamber 320 may stably store regeneration water to be supplied to the regenerator 161. That is, water for regeneration may be sufficiently stored in the regeneration water chamber 320. Accordingly, water for regeneration may be sufficiently supplied into the regenerator 161, and a reduction in performance of the water softener 162 may be prevented. In addition, it is possible to reduce difficulty in supplying regeneration water caused by the installation environment of the dishwasher 1.

In response to opening the regeneration water inlet valve 132, regeneration water may be supplied to the regenerator 131 through the regeneration water input hose 132a. Accordingly, the regenerator 161 may regenerate the water softener 162.

The regeneration water inlet valve 132 may be provided at the lower portion of the regeneration water chamber 320 and control whether to supply water to be supplied to the regenerator 161. In order to prevent the water stored in the soft water chamber 310 from being discharged into the regeneration water chamber 320, the regeneration water inlet valve 132 may be opened in response to the water level in the soft water chamber 310 being lower than the water level in the regeneration water chamber 320. For example, the regeneration water inlet valve 132 may be opened when the soft water chamber 310 is empty. However, it is not limited to the above examples.

Alternatively, when the dishwasher 1 is in a drying cycle, the regeneration water inlet valve 132 may be opened. That is, the regeneration water inlet valve 132 may be opened during a final cycle of the dishwasher 1. However, it is not limited to special cycle. Alternatively, in response to closing the door 11, the regeneration water inlet valve 132 may be opened.

The regeneration water inlet valve 132 may be opened in the above-mentioned states. Accordingly, the water stored in the water tank 300 may be prevented from leaking even when a user opens the door 11 or stops the dishwasher 1 during operation. At this time, it is possible to detect whether the door is open or not through a sensor (not shown) provided on the door 11.

While the present disclosure has been particularly described with reference to exemplary embodiments, it should be understood by those of skilled in the art that various changes in form and details may be made without departing from the spirit and scope of the present disclosure.

What is claimed is:

1. A dishwasher comprising: a water softener to which a filter is mountable; a regenerator; and a water tank including: a soft water chamber configured to receive water softened by the water softener as soft water, and to store the received soft water, a regeneration water chamber configured to receive soft water stored in the soft water chamber from the soft water chamber, store the soft water received from the soft water chamber, and supply soft water stored in the regeneration water chamber to the regenerator to regenerate the filter while the filter is mounted to the water softener, and a communication flow path formed in a middle of the water tank and configured to allow soft water to flow from the soft water chamber to the regeneration water chamber after the soft water chamber is filled.

2. The dishwasher of claim 1, wherein the water tank further includes a water tank case forming an exterior of the water tank, and the communication flow path is recessed on a surface of the water tank case.

3. The dishwasher of claim 1, wherein the water tank further includes a first flow path wall forming a first flow path to receive water from an outside of the water tank, and a second flow path wall forming a second flow path to supply water from the first flow path to the water softener, and the regeneration water chamber is formed between the first flow path wall and the second flow path wall.

4. The dishwasher of claim 3, wherein the communication flow path bypasses the second flow path wall to extend vertically between the soft water chamber and the regeneration water chamber.

5. The dishwasher of claim 1, wherein the regeneration water chamber includes a pressure holder connected to an outside of the soft water chamber to allow a pressure in the regeneration water chamber to be equilibrated with atmospheric pressure.

6. The dishwasher of claim 5, wherein the pressure holder is configured to allow the soft water chamber and the regeneration water chamber to communicate with each other.

7. The dishwasher of claim 5, wherein the pressure holder is arranged at an upper portion of the water tank to store water at a high level in the water tank.

8. The dishwasher of claim 5, wherein the water tank includes an inclined rib inclined with respect to a water surface in the water tank, and the pressure holder is formed below the inclined rib.

9. The dishwasher of claim 5, wherein the water tank includes a water tank case forming an exterior of the water tank, and the pressure holder is recessed on a surface of the water tank case.

10. The dishwasher of claim 1, wherein the regenerator is arranged below the water tank, and the dishwasher further includes a regeneration water inlet valve arranged below the regeneration water chamber to supply soft water stored in the regeneration water chamber to the regenerator.

11. The dishwasher of claim 10, wherein the regeneration water inlet valve is configured to be opened in response to a water level in the soft water chamber being lower than a water level in the regeneration water chamber.

12. The dishwasher of claim 11, wherein the regeneration water inlet valve is configured to be opened in response to the soft water chamber being empty.

13. The dishwasher of claim 1, further comprising: a damper provided in the communication flow path and configured to adjust an amount of water flowing from the soft water chamber to the regeneration water chamber.

* * * * *